US006674006B1

(12) United States Patent
Linehan et al.

(10) Patent No.: US 6,674,006 B1
(45) Date of Patent: Jan. 6, 2004

(54) LOAD CONFIGURABLE ELECTRICAL DISTRIBUTION BUS

(75) Inventors: Thomas Linehan, Clarkston, MI (US); Fred Schroeder, Shelby Township, MI (US); Todd Johnston, Oxford, MI (US); John Khalaf, Farmington Hills, MI (US)

(73) Assignee: D-M-E Company, Madison Heights, MI (US)

( * ) Notice: Subject to any disclaimer, the term of this patent is extended or adjusted under 35 U.S.C. 154(b) by 32 days.

(21) Appl. No.: 10/339,846

(22) Filed: Jan. 10, 2003

(51) Int. Cl.[7] .................................................. H02G 5/00

(52) U.S. Cl. .................. 174/72 B; 174/68.2; 174/99 B; 174/149 B

(58) Field of Search ............................. 174/72 B, 68.2, 174/88 B, 99 B, 149 B

(56) References Cited

U.S. PATENT DOCUMENTS 2,862,117 A 11/1958 Rowe
3,264,403 A 8/1966 Erdle
3,322,878 A 5/1967 Christensen
3,400,303 A 9/1968 Rowlands et al.
3,730,971 A 5/1973 Durham et al.
3,995,103 A 11/1976 Gehrs et al.
5,055,059 A 10/1991 Logstrup
5,831,812 A * 11/1998 Livingston .................. 361/611
5,995,362 A * 11/1999 Morel et al. ................ 361/647
6,433,999 B1 * 8/2002 Muse et al. ................. 361/624

* cited by examiner

*Primary Examiner*—Dean A. Reichard
*Assistant Examiner*—W. David Walkenhorst
(74) *Attorney, Agent, or Firm*—John W. Gregg

(57) ABSTRACT

An assembly for electrical distribution includes not less than six conductors, the assembly defining a distribution portion and a source application portion, load connecting portions of the conductors being arranged in overlying layers in the distribution portion of the assembly. The load connecting portion of each conductor includes at least one load connection portion projecting beyond the overlying layers of the assembly whereby each load is connected between two conductors at the distribution portion of the assembly. The source connection portion of each conductor having at least one connection element, the source connection portion of each conductor being electrically isolated from the source connection portions of all other conductors. The assembly further includes a common conductor for connection to a neutral reference of the source and conductive straps for selectively interconnecting conductors and the common conductor to electrically configure the connected loads according to one of single phase, three phase wye and three phase delta configurations.

8 Claims, 3 Drawing Sheets

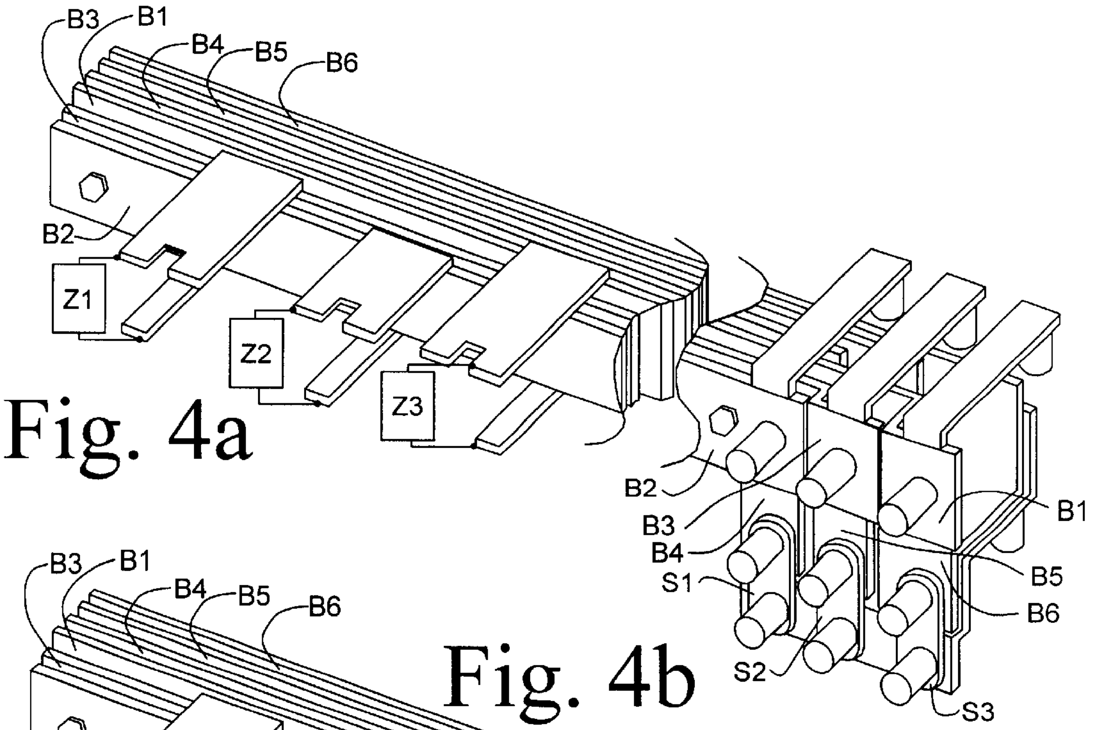
Fig. 4a
Fig. 4b
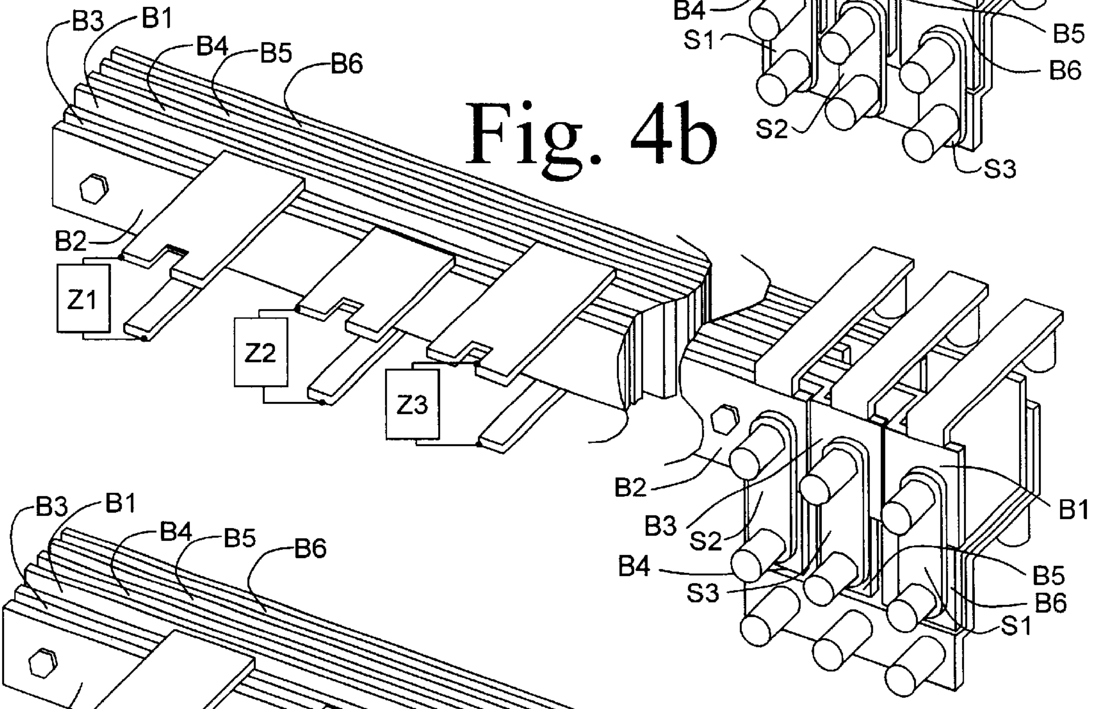
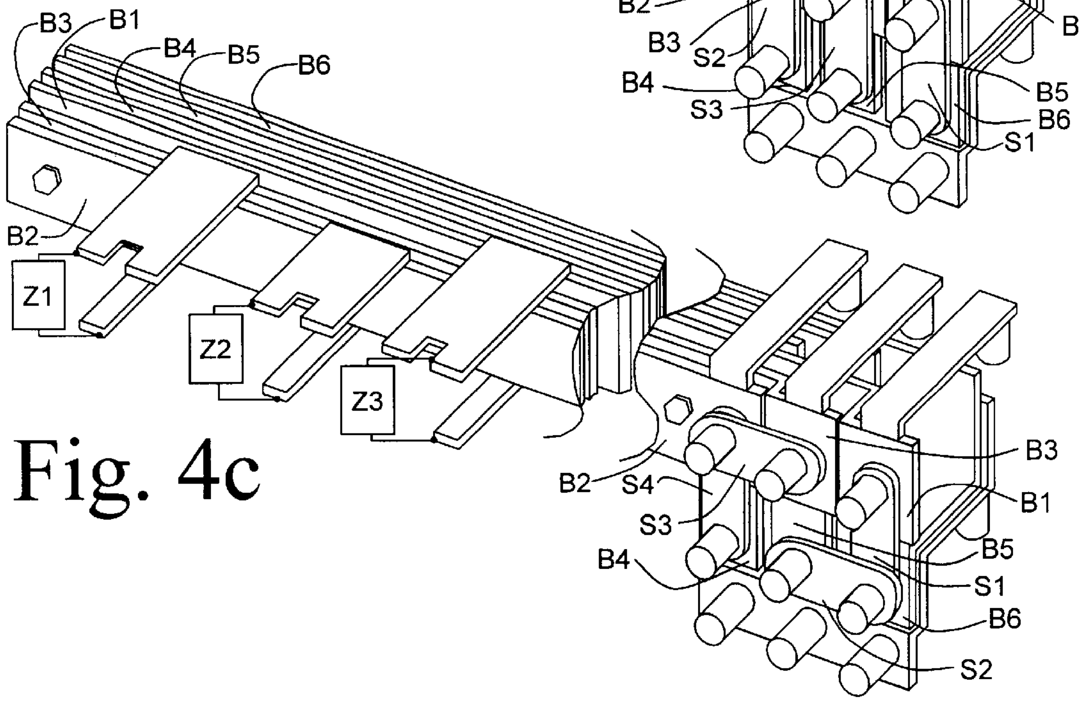
Fig. 4c

LOAD CONFIGURABLE ELECTRICAL DISTRIBUTION BUS

BACKGROUND OF THE INVENTION

1. Field of the Invention

This invention relates generally to electrical power distribution for electrical equipment. In particular, this invention relates to bus systems for distribution of power in electrical equipment from a source connection terminus to plural loads.

2. Description of Related Art

It is known to provide electrical bus systems comprising laminations of conductors and insulators. Further, it is known to provide laminated bus systems permitting interconnection of selected conductor pairs of a single bus construction to adapt for connection of A.C. and D.C. sources. Heretofore, configuration of connection of loads to bus systems as "wye", "delta" or single phase has required particular arrangement of the connections to the loads. Predetermination of connections of loads to the bus system has not been possible as the prior art has not provided means for adapting configuration of already connected loads among three phase "wye", three phase "delta" and single phase configurations. Hence, it has heretofore been necessary to connect loads to power distribution bus systems during equipment installation to achieve the load electrical configuration required by the applied source. The necessity of connecting loads to bus systems during equipment installation can result in errors in connections that produce imbalances of loads among source phases or loads not being connected so as to derive the required power for intended operation. Hence, there remains a need to reduce the opportunities for mis-connection of loads to bus systems while permitting configuration of load connections as "wye", "delta" or single phase as desired.

SUMMARY OF THE INVENTION

It is an object of the present invention to provide an electrical distribution assembly having conductors for connection to electrical loads, the assembly having a source application portion wherein interconnections between conductors by connecting straps are selectively applied to achieve an electrical configuration of connected loads according to one of three phase "wye", three phase "delta", and single phase configurations.

Further objects and advantages of the invention shall be made apparent from the accompanying drawings and the following description thereof.

In accordance with the aforesaid objects, an assembly defining a distribution portion and a source application portion and comprising not less than six conductors, each conductor comprising a load connecting portion and a source connection portion, the load connecting portions of the conductors being arranged in overlying layers in the assembly. The load connecting portion of each conductor comprises at least one load connection portion projecting beyond the overlying layers of the assembly whereby each load is connected between two conductors at the distribution portion of the assembly. The source application portion of each conductor comprises a source connection portion having at least one connection element, the source connection portion of each conductor being electrically insulated from the source connection portions of all other conductors. The assembly further comprises a common conductor comprising a source connection portion having three connection elements, the common conductor for connection to a neutral reference of the source. The assembly further comprises conductive straps interconnecting selected connection portions to electrically configure the connected loads according to one of single phase, three phase wye and three phase delta configurations.

BRIEF DESCRIPTION OF THE DRAWINGS

FIGS. 4*a*–4*c* illustrate application of interconnecting straps for the load electrical configurations illustrated by FIGS. 3*a*–3*c*.

DETAILED DESCRIPTION OF THE PREFERRED EMBODIMENT

The invention shall be illustrated with reference to a preferred embodiment which shall be described in detail. It is not the intention of applicants that the invention be limited to the preferred embodiment, but rather that the invention shall be defined by the appended claims and all equivalents thereof.

Figure 1:
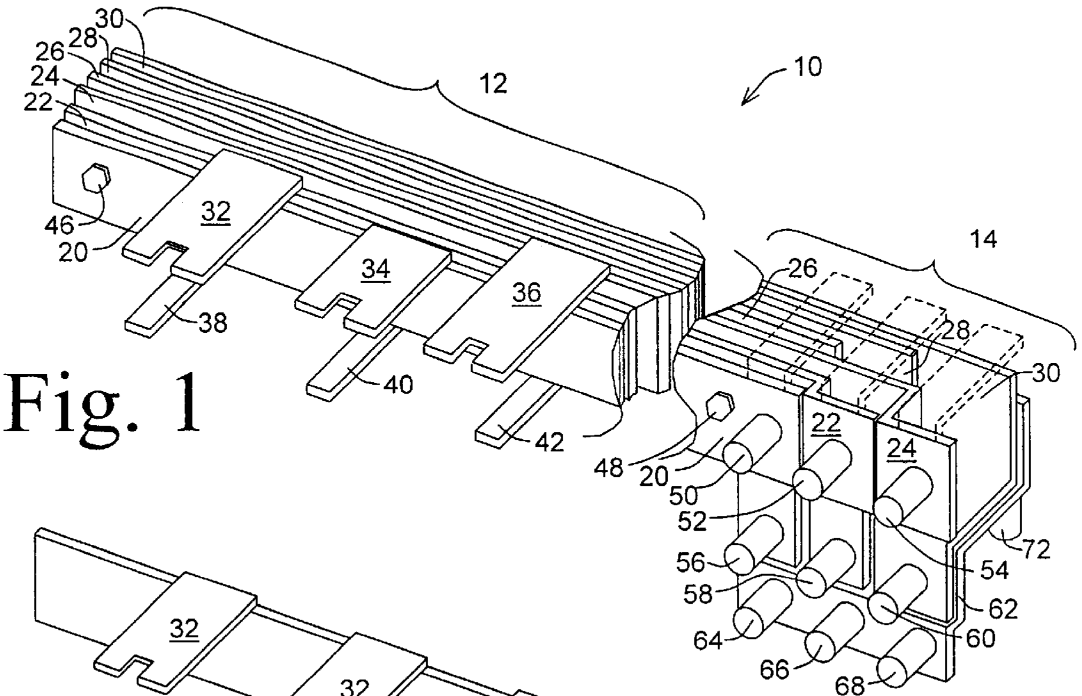
FIG. 1 is a three dimensional view of a bus bar assembly in accordance with the invention.

Referring to FIG. 1, bus bar assembly 10 is shown with distribution portion 12 broken from source application portion 14. Bus bar assembly 10 comprises no less than six conductors, 20, 22, 24, 26, 28 and 30. Distribution portion 12 includes load connecting portions comprising load connection portions such as portions 32, 34, 36, 38, 40 and 42 of conductors 20–30 projecting beyond the assembly to facilitate connection of loads. Source application portion 14 comprises source connection portions comprising source connection elements 50, 52, 54, 56, 58, and 60 of conductors 20–30 for interconnection of conductors according to the selected load configuration. In addition, source application portion 14 comprises common conductor 62 having common connection elements 64, 66 and 68 also employed in interconnections for load configurations. Conductors of a source of electrical energy, for example, from a mains supply, are connected to assembly 10 at the source application portion 14. Each of conductors 20–30 is formed of substantially flat conductive material, each having a unique shape adapted to its intended relative location within assembly 10. Source connection elements 50–68 are mounted to the respective conductors by fasteners (not shown) to achieve electrical conduction between the connection element and the conductor. Excepting connection regions of the load connection portions and connection elements, each conductor is advantageously coated with an insulating material to provide electrical insulation of the conductors one from the other as fitted in assembly 10. In addition to the insulating coating, insulating sheet material (not shown) is advantageously interspersed between conductors as arranged in assembly 10. The material and the thickness of insulating sheets are selected according to the characteristics of the applied power to insure electrical insulation throughout the environmental operating range specified for assembly 10. Conductors 20–30, together with insulating sheets if any, are bound together in assembly 10 by non-conductive fasteners, such as bolts 46 and 48 (nuts not shown), spaced along the length of assembly 10.

Figure 2A:
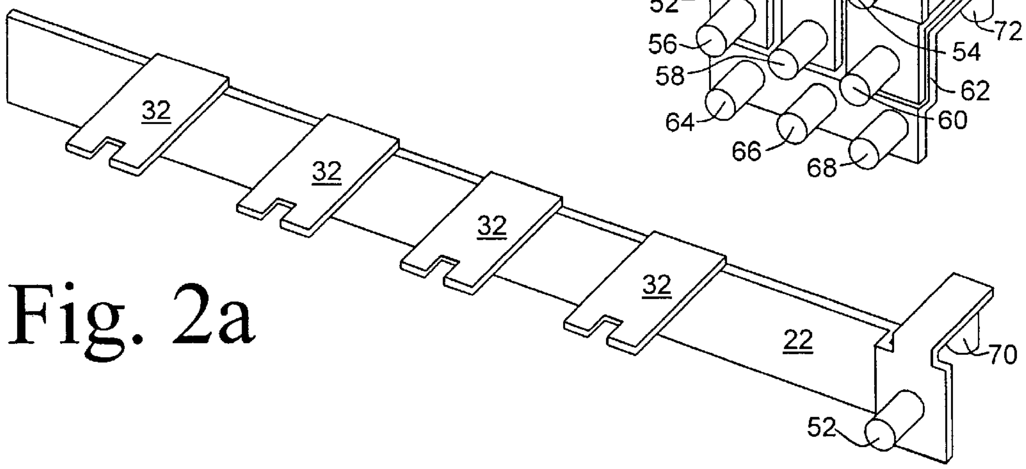
FIGS. 2*a*–2*b* illustrate conductors of the bus bar assembly of FIG. 1
Figure 2B:
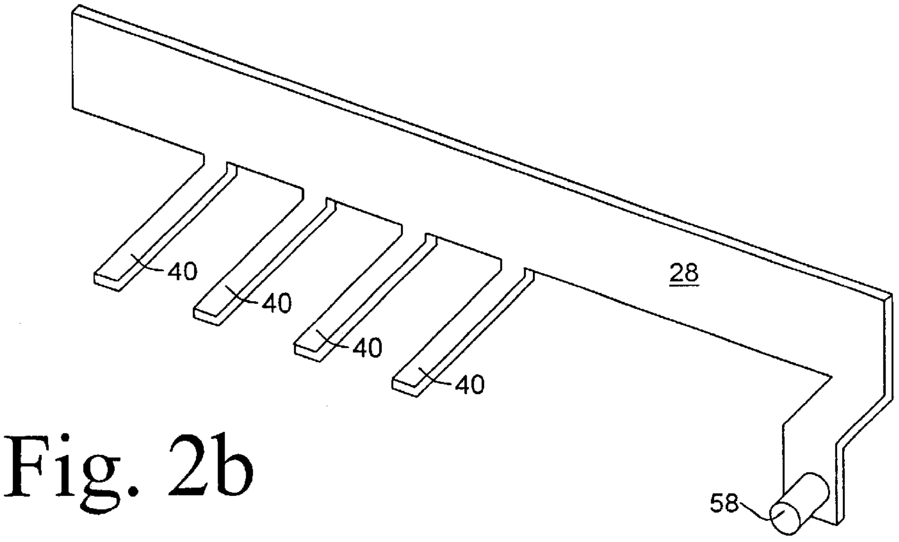

Referring to FIGS. 2*a* and 2*b*, examples of complete conductors corresponding to conductors 22 and 28, respectively, of FIG. 1 are shown in three dimensional views. Although illustrated in lengths accommodating four load connection portions, (connection portions 32 in FIG. 2*a*; connection portions 40 in FIG. 2*b*) the number of load connection portions and the length of each conductor is entirely a matter of design according to the equipment to which power is to be distributed. Projecting connection portions in the load connecting portions of conductors 20–24 are formed so that the projection distance beyond assembly 10 for all conductors is substantially the same. Likewise, projecting connection portions in the load connecting portions of conductors 26–30 are formed so that the projection distance beyond assembly 10 is substantially the same. Although shown as projecting solely at right angles to assembly 10, the connection portions, or a portion of the connection portions may be advantageously formed to be directed at an angle appropriate to reduce the sharpness of the final curve or bend of load conductors being connected to the connecting portions. Otherwise, the form of the conductors and connection portions within the load connecting portions of conductors 20–30 are formed to facilitate assembly in a laminated fashion as illustrated in FIG. 1. In that regard it is expressly contemplated that the projecting portions may be formed to extend in the plane of the conductor above or below the conductor edge from which they project to provide clearance from the conductors in the assembly above or below which the projecting connection portions extend. Advantageously, particular connecting elements such as commercially supplied connecting tabs (not shown) are fixed by rivets or other fasteners to the projecting extremities of connecting portions, such as portions 32 and 40, for mating connection with connecting elements such as so called "push-on" lugs affixed to conductors connected to loads. Except for the projecting connection portions, conductors 20–30 are substantially flat and elongate within the distribution portion 12 of assembly 10.

As seen in FIG. 2*a*, conductor 22 is advantageously formed with a rearwardly projecting extension above the source connection portion (extension shown dashed in FIG. 1). A connection element 70 is attached to this extension so as to achieve electrical conduction between conductor 22 and connection element 70. The extension is formed to permit connection element 70 to be behind and electrically isolated from conductor 62 in assembly 10. In a like manner, each of conductors 20 and 24 are provided with rearwardly projecting extensions and connection elements (extensions shown dashed in FIG. 1). Connection element 70 along with the corresponding connection elements of conductors 20 and 24 facilitate connection of source carrying conductors from a mains supply to assembly 10 so as not to interfere with access to connection elements 50–60 and 64–68.

As seen in FIG. 1, the source connection portions of conductors 20–30 and common conductor 62 are formed to permit connection elements 50–60 and 64–68 to project from substantially the same plane. Considering FIG. 2*a*, the source connection portion of conductor 22 is formed to present a base for source connection element 52 electrically isolated from and in substantially the same plane as the base for source connection element 50. In a like manner, the source connection portion of conductor 24 is formed to present a base for source connection element 54 electrically isolated from and in substantially the same plane as the base for source connection element 52. As seen in FIG. 2*b*, the source connection portion of conductor 28 is formed to provide a base for source connection element 58 electrically isolated from the like bases of conductors 26 and 30. The base for source connection element 58, as well as the bases for source connection elements 56 and 60 lie in substantially the same plane as the bases for source connection elements 50–54. Considering FIG. 1 together with FIG. 2b, it is seen that the projection from the major length of conductor 28 to the base for support element 58 is dependent on the relative position of conductor 28 in the assembly of conductors. Likewise, for each of conductors 26 and 30 the projection from the major length of the elongate conductor to the base for the connection element is determined according to the relative position of the conductor in assembly 10.

Figure 3A:
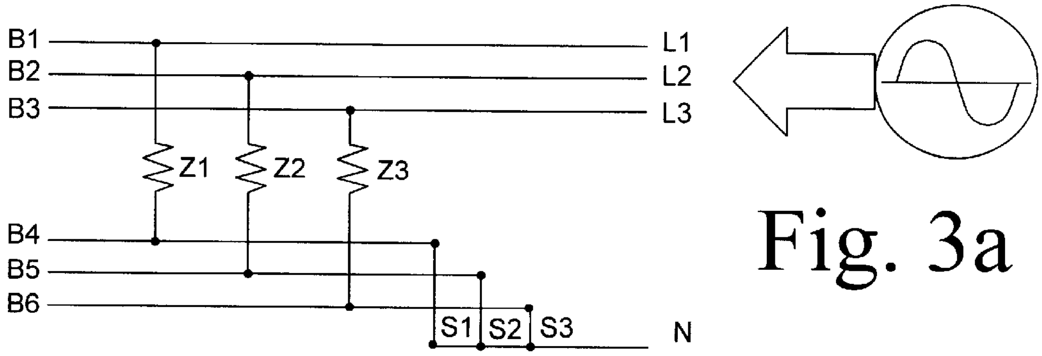
FIGS. 3*a*–3*c* are electrical diagrams illustrating alternative electrical configurations of loads connected to the bus bar assembly of FIG. 1.
Figure 3B:
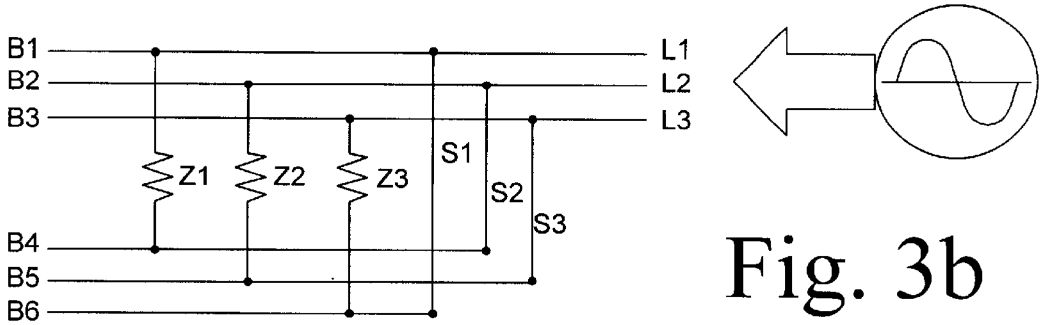
Figure 3C:
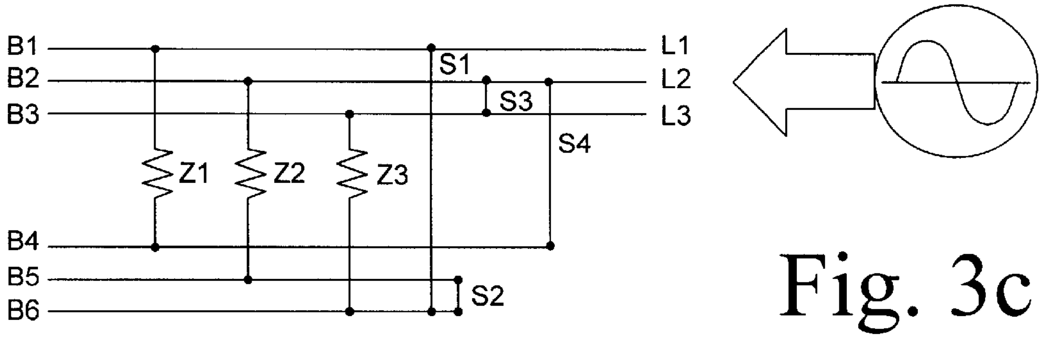

Referring to FIGS. 3*a*–3*c*, electrical configurations of loads are illustrated for three phase "wye", three phase "delta" and single phase, respectively. In the electrical diagrams, loads are represented by Z1, Z2 and Z3, the conductors 20–30 of assembly 10 are identified as B1, B2, B3, B4, B5 and B6 (correspondence is set forth in Table 1), and the power source is applied at connections for source lines L1, L2, and L3 in the source connection portions of conductors 20, 22 and 24 (see, for example, connection element 70 in FIG. 2*a*). In FIG. 3*a* (three phase "wye") a connection to an electrical neutral ("N") of the source is provided in addition to connections to lines L1, L2, and L3. Connection of the source neutral to assembly 10 is made to common conductor 62 (FIG. 1.) by means of connection element 72 attached thereto (FIG. 1.). The connections of loads among lines L1, L2, L3 and N are effected at the source connection portion using conductive straps S1, S2 and S3 (three phase configurations) and conductive straps S1, S2, S3 and S4 (single phase configuration). The actual loads represented by each of Z1, Z2 and Z3 will typically be plural devices distributed over the plural load connecting portions of conductors 20–30, an objective of the actual connections to conductors 20–30 being to achieve a balance of load current among the source lines L1, L2 and L3. In the "wye" configuration of FIG. 3*a*, one end of all loads are connected to the neutral "N" via straps S1, S2 and S3 connecting all of conductors B4, B5 and B6 together and to the source neutral. In the "delta" configuration of FIG. 3*b*, load Z1 is connected between source lines L1 and L2 by conductive strap S2; load Z2 is connected between source lines L2 and L3 by conductive strap S3; and load Z3 is connected between source lines L2 and L3 by conductive strap S1. In the single phase configuration of FIG. 3*c*, source lines L2 and L3 are connected together by strap S3; load Z1 is connected between source lines L1 and L2 by straps S4 and S3; load Z2 is connected between source lines L2 and L1 by straps S2 and S1; and load Z3 is connected between source lines L2 and L1 by straps S3 and S1.

As illustrated by the electrical diagrams of FIGS. 3*a*–3*c*, actual loads represented by the loads Z1, Z2 and Z3 are connected to the conductors B1–B6 irrespective of whether the loads are to be electrically configured as three phase "wye", three phase "delta" or single phase. Irrespective of the actual number of loads to be connected, the connection of loads (approximate equalization of electrical current delivered to the loads) as presented to the applied source. Connections are made between loads and power distribution conductors in such equipment irrespective of the electrical configuration required for the loads by the applied source. Adaptation of the loads to the electrical configuration required by the source is then facilitated using conductive straps S1–S4 without the need for rearranging connections between the loads and the conductors of assembly 10.

TABLE 1

| Conductor (FIG. 1) | Connection Element | Conductor (FIGS. 3a–3c) | Source Line |
|---|---|---|---|
| 20 | 50 | B2 | L2 |
| 22 | 52 | B3 | L3 |
| 24 | 54 | B1 | L1 |
| 26 | 56 | B4 | |
| 28 | 58 | B5 | |
| 30 | 60 | B6 | |

Physical arrangements of conductors B1–B6, loads Z1–Z3, and conductive straps S1–S4 of FIGS. 3*a*–3*c*, as applied to assembly 10 of FIG. 1, are illustrated in FIGS. 4*a*–4*c*, respectively. In FIG. 4*a*, conductive strap S1 is fitted between connection elements 56 and 64, conductive strap S2 is fitted between connection elements 58 and 66, and conductive strap S3 is fitted between connection elements 60 and 68. As all of connection elements 64, 66, and 68 are electrically interconnected by virtue of attachment to conductor 62, all of conductors B4, B5, and B6 are electrically connected to one another and to electrical neutral (as illustrated in FIG. 3*a*) by conductive straps S1, S2 and S3. In FIG. 4*b*, strap S1 is fitted between connection elements 54 and 60 connecting conductors B1 and B6, strap S2 is fitted between connection elements 50 and 56 connecting conductors B2 and B4, and strap S3 is fitted between connection elements 52 and 58 connecting conductors B3 and B5 (all as illustrated in FIG. 3*b*). In FIG. 4*c*, conductive strap S1 is fitted between connection elements 54 and 60 and conductive strap S2 is fitted between connection elements 60 and 58, conductive straps S1 and S2 interconnecting conductors B1, B6 and B5; conductive strap S3 is fitted between connection elements 50 and 52 and conductive strap S4 is fitted between connection elements 50 and 56, conductive straps S3 and S4 interconnecting conductors B2, B3 and B4 (all as illustrated in FIG. 3*c*). As seen in FIGS. 4*a*–4*c*, connection elements of the source application portions of conductors B1–B6 and of common conductor 62 are spatially arrayed in a matrix of three rows and three columns, projecting from substantially the same plane facilitating application of conductive straps S1–S4. Advantageously, the spatial arrangement of connection elements in the matrix is such that the conductive straps are physically uniform in size and shape so that any conductive strap may be applied between connection elements in adjacent rows or adjacent columns.

What is claimed is:

1. An assembly for distributing electrical energy from a source, the assembly defining a distribution portion and a source application portion and comprising at least six conductors, each conductor comprising at least one load connecting portion and a source connection portion, the load connecting portions being arranged in overlying layers wherein the conductors are electrically insulated one from the other and each load connecting portion comprising at least one load connection portion projecting beyond the overlying layers whereby each load is connected between two conductors at the distribution portion of the assembly, each source connection portion comprising at least one connection element, the source connection portion of each conductor being electrically Isolated from the source connection portions of all other conductors, a common conductor comprising a source connection portion having three connection elements, the common conductor for connection to a neutral reference of a three phase source, and conductive straps interconnecting selected source connection portions to electrically configure the connected loads according to one of single phase, three phase wye, and three phase delta configurations.

2. The assembly of claim 1 wherein the load connection portion of each conductor is formed so that the projection distance beyond the overlying layers for all conductors is substantially the same.

3. The assembly of claim 1 wherein each conductor is coated with an insulating layer except for connection regions of the load connection portion and the source connection portion.

4. The assembly of claim 1 wherein each load connection portion is formed to accept a particular connecting element configured for mating engagement of a connecting element of a load connecting conductor.

5. The assembly of claim 4 wherein the particular connecting element is fixedly attached to the load connection portion.

6. The assembly of claim 1 wherein connection elements of the common conductor and of the source connection portions of the conductors are spatially arrayed in a square matrix of three rows and three columns and wherein each conductive strap spans the distance between two adjacent connection elements lying in a row or column of the matrix.

7. The assembly of claim 6 wherein the source connection portions of three conductors further comprise an extension projecting rearwardly above the source application portion of the assembly, each such extension having a connection element attached thereto for connection of a conductor of the electrical energy source.

8. The assembly of claim 7 wherein the common conductor further comprises a connection element attached thereto for connection of a conductor of a neutral reference of the electrical energy source.

* * * * *